(12) United States Patent
Floyd et al.

(10) Patent No.: US 6,243,692 B1
(45) Date of Patent: Jun. 5, 2001

(54) SECURE ELECTRONIC SOFTWARE PACKAGING USING SETUP-EXTERNAL UNLOCKING MODULE

(75) Inventors: Michel Floyd, Redwood City; Cay S. Horstmann, Cupertino, both of CA (US)

(73) Assignee: Preview Software, Cupertino, CA (US)

( * ) Notice: Subject to any disclaimer, the term of this patent is extended or adjusted under 35 U.S.C. 154(b) by 0 days.

(21) Appl. No.: 09/082,964

(22) Filed: May 22, 1998

(51) Int. Cl.[7] ................................................ G06F 17/60
(52) U.S. Cl. .......................... 705/59; 705/51; 705/57; 705/58
(58) Field of Search ................................. 705/1, 51, 57, 705/58, 59

(56) References Cited

U.S. PATENT DOCUMENTS 4,118,789 * 10/1978 Casto et al. ............................ 364/184
5,014,234 * 5/1991 Edwards, Jr. ........................ 713/200

(List continued on next page.)

FOREIGN PATENT DOCUMENTS 0 297 347 * 1/1989 (EP) .

OTHER PUBLICATIONS

B.C. Housel and R.W. Tacker, IBM Technical Disclosure Bulletin, vol. 14, No. 1, pp. 51–53, Jun. 1971.*
Freedman, Beth, "1–2–3 Networker Arrives Late, Receives Lukewarm Reception," PC Week, vol. 4, No. 48, p. 1, Dec. 1987.*
Litwin, Paul, "Making Sense of JET Security," Visual Basic Programmer's Journal, vol. 5, No. 3, p. 66, Mar. 1995.*
National Report on Computers& Health, vol. 12, No. 19, "Data Processing Resources", Sep. 16, 1991.*

*Primary Examiner*—James P. Trammell
*Assistant Examiner*—Nicholas David Rosen
(74) *Attorney, Agent, or Firm*—Burns Doane Swecker & Mathis L.L.P.

(57) ABSTRACT

The present invention, generally speaking, provides for secure electronic software packaging using a setup-external unlocking module. As a result, a software publisher can produce a single ESD-ready version of a software title that may later be prepared for distribution through multiple different ESD channels by adding channel-specific unlocking modules. Duplication of the injection process prior to the packing of the setup file set is eliminated and great flexibility is achieved. Preferably, the single ESD-ready version allows for trial of the software, e.g., a free 30-day trial. Software publishers are incentivized to produce trial versions of their software for marketing purposes. Once such a trial version of a software title has been produced, no further modifications are required on the part of the software publisher in order to distribute the software through various different channels. In one embodiment, the software publisher produces a trial version of a software title using a technology provider tool to inject the program executable with "guard code" referred to herein as a protection module. The protection module allows the program to be run only in accordance with trial parameters specified by the software publisher. The protection module will typically lack commerce capabilities required in order to purchase the software, i.e., obtain unlimited usage of the software or at least usage beyond the original trial period. After the software has been injected with the protection module, a conventional installation tool is used to produce a setup file set. At this point, the BOB can be downloaded and tried but cannot be purchased. That is, unlike competing technologies, the BOBs at his point are fully functional trial versions that can be tested and tried without adding purchase capabilities.

22 Claims, 4 Drawing Sheets

U.S. PATENT DOCUMENTS

| | | | | |
|---|---|---|---|---|
| 5,023,907 | * | 6/1991 | Johnson et al. | 380/4 |
| 5,155,680 | * | 10/1992 | Wiedemer | 705/52 |
| 5,341,429 | * | 8/1994 | Stringer et al. | 380/23 |
| 5,579,222 | * | 11/1996 | Bains et al. | 395/712 |
| 5,673,315 | * | 9/1997 | Wolf | 380/4 |
| 5,708,709 | * | 1/1998 | Rose | 380/4 |
| 5,715,169 | * | 2/1998 | Noguchi | 364/479.07 |
| 5,745,879 | * | 4/1998 | Wyman | 705/1 |
| 5,758,068 | * | 5/1998 | Brandt et al. | 713/200 |
| 5,790,664 | * | 8/1998 | Coley et al. | 709/203 |
| 5,805,802 | * | 9/1998 | Marx | 713/203 |
| 5,864,620 | * | 1/1999 | Pettitt | 380/4 |
| 5,870,726 | * | 2/1999 | Lorphelin | 705/400 |
| 5,915,018 | * | 6/1999 | Aucsmith | 380/4 |
| 5,930,357 | * | 7/1999 | Fukui | 705/59 |
| 5,933,497 | * | 8/1999 | Beetcher et al. | 705/59 |
| 5,974,549 | * | 10/1999 | Golan | 713/200 |
| 6,009,401 | * | 12/1999 | Horstmann | 705/1 |
| 6,044,469 | * | 3/2000 | Horstmann | 713/201 |

* cited by examiner

US 6,243,692 B1

SECURE ELECTRONIC SOFTWARE PACKAGING USING SETUP-EXTERNAL UNLOCKING MODULE

BACKGROUND OF THE INVENTION

1. Field of the Invention

The present invention relates to software distribution, particularly electronic software distribution.

2. State of the Art

Electronic software distribution, or ESD, is technology that enables software publishers and resellers to use the Internet as a direct channel to customers. ESD provides a fast, efficient alternative to the distribution of shrink-wrapped software products in retail stores. ESD follows one of two models, either Buy-Before-You-Try (Buy/Try) or Try-Before-You-Buy (Try/Buy). Try/Buy is technologically more complex but is favored by buyers and is advantageous for sellers as well.

A software tool for Try/Buy "self-wrapping" of software programs is sold by Preview Software, the present assignee. Using this tool, a software program is "injected" with a code module that performs trial protection and enables electronic purchase of the software program. The injected software program and related files are then packed as a program archive, or setup file set, using a conventional installation tool such as InstallShield™ installation software. A secondary setup executable is added outside the program archive and functions to install distribution information and instructions.

The foregoing process may be more clearly understood with reference to FIG. 1. A program executable has added to it trial and commerce information, resulting in a modified executable. The modified executable and other files are processed by an installer tool to produce a setup file set, e.g., setup.exe, that is a ready-to-install Try/Buy application.

Various other competing and incompatible Try/Buy ESD technologies have emerged, offered by such technology providers as TestDrive Software, Release Software and TechWave, Inc. ESD merchants have aligned themselves with different ones of these technology providers. As a result, software publishers have faced either choosing one technology provider and ignoring merchants aligned with other technology providers, or producing multiple different versions of a software title for different channels, resulting in considerable expense and duplication of effort.

SUMMARY OF THE INVENTION

The present invention, generally speaking, provides for secure electronic software packaging using a setup-external unlocking module. As a result, a software publisher can produce a single ESD-ready version of a software title that may later be prepared for distribution through multiple different ESD channels by adding channel-specific unlocking modules. Duplication of the injection process prior to the packing of the setup file set is eliminated and great flexibility is achieved. Preferably, the single ESD-ready version allows for trial of the software, e.g., a free 30-day trial. Software publishers are incentivized to produce trial versions of their software for marketing purposes. Once such a trial version of a software title has been produced, no further modifications are required on the part of the software publisher in order to distribute the software through various different channels. In one embodiment, the software publisher produces a trial version of a software title using a technology provider tool to inject the program executable with "guard code" referred to herein as a protection module. The protection module allows the program to be run only in accordance with trial parameters specified by the software publisher. The protection module will typically lack commerce capabilities required in order to purchase the software, i.e., obtain unlimited usage of the software or at least usage beyond the original trial period. After the software has been injected with the protection module, a conventional installation tool is used to produce a setup file set. At this point, the BOB can be downloaded and tried but cannot be purchased. That is, unlike competing technologies, the BOBs at his point are fully functional trial versions that can be tested and tried without adding purchase capabilities.

To ready a BOB for use beyond trial, a technology provider tool is used to add an unlocking module to the BOB, together with a secondary license file, adding necessary commerce parameters. The unlocking module and secondary license file are added outside the BOB (i.e., the setup file set), which cannot be readily penetrated. In one embodiment, the unlocking module has both trial monitoring capabilities and commerce capabilities. The augmented software program may then be delivered from a server that functions as part of a BOB farm where a collection of wrapped software programs (Bags of Bits, or BOBs) are maintained. In operation, when the software program is installed and run, the protection module checks whether a unlocking module is present. If not, the protection module handles trial protection. If an unlocking module is present, the protection module uses a defined mechanism for communication between the protection module and the unlocking module to authenticate the unlocking module. If the unlocking module is authenticated, the protection module then cooperates with the unlocking module. Through the unlocking module, the software program may be tried and then unlocked at any time. In a typical embodiment, unlocking is predicated upon transmitting payment to a payment clearinghouse and receiving authorization. Alternatively, the unlocking module may read and verify an electronic license that the end-user has purchased, or communicate with a license server that stores electronic licenses and dispenses authorization to execute software programs.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

Figure 1:
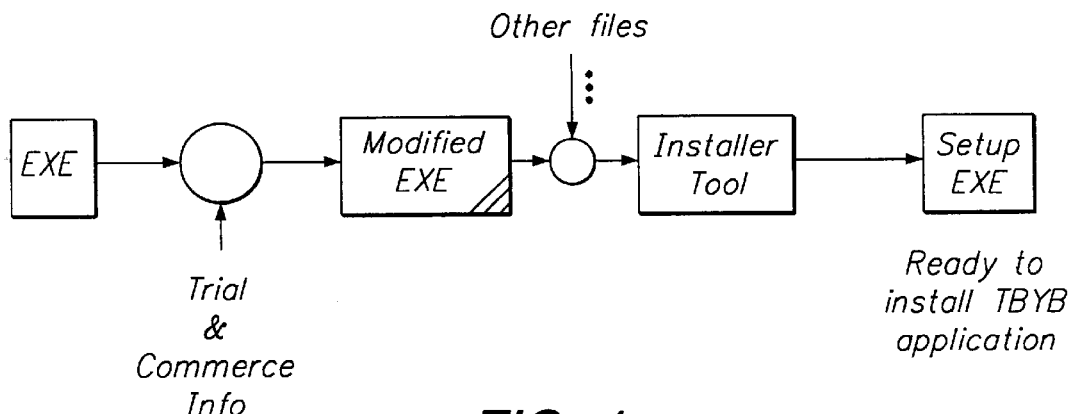
FIG. 1 is a diagram of a software wrapping process.
Figure 2:
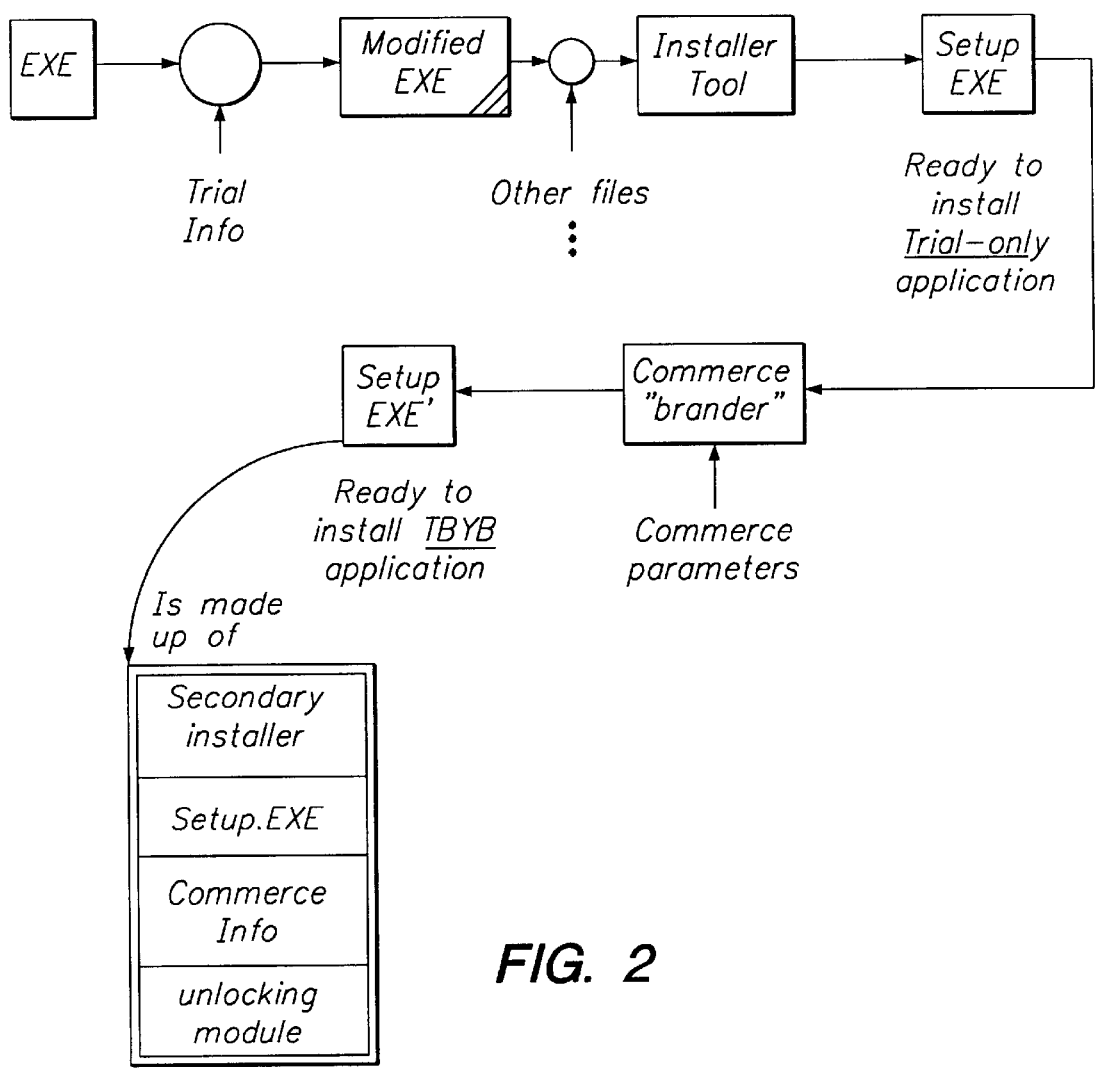
FIG. 2 is a diagram of software wrapping process in accordance with the present invention.

Referring now to FIG. 2, a software wrapping process in accordance with the present invention is shown. A program executable has added to it trial information only, resulting in a modified executable. The modified executable and other files are processed by an installer tool to produce a setup file set, e.g., setup.exe, that is a ready-to-install trial-only application. A commerce "brander" is then used to add commerce parameters to the trial-only application. These parameters may include the name of the merchant, the price of the product, phone numbers or email address to use for support during the purchase process, the choice of commerce method (e.g., phone or Internet unlock) and the basic SKUs and product IDs used to track sales. There results a ready-to-install Try/Buy application, e.g. setup.exe'. The Try/Buy application is made up of the trial-only application (setup.exe), a secondary installer, the unlocking module, and commerce information.

Figure 3:
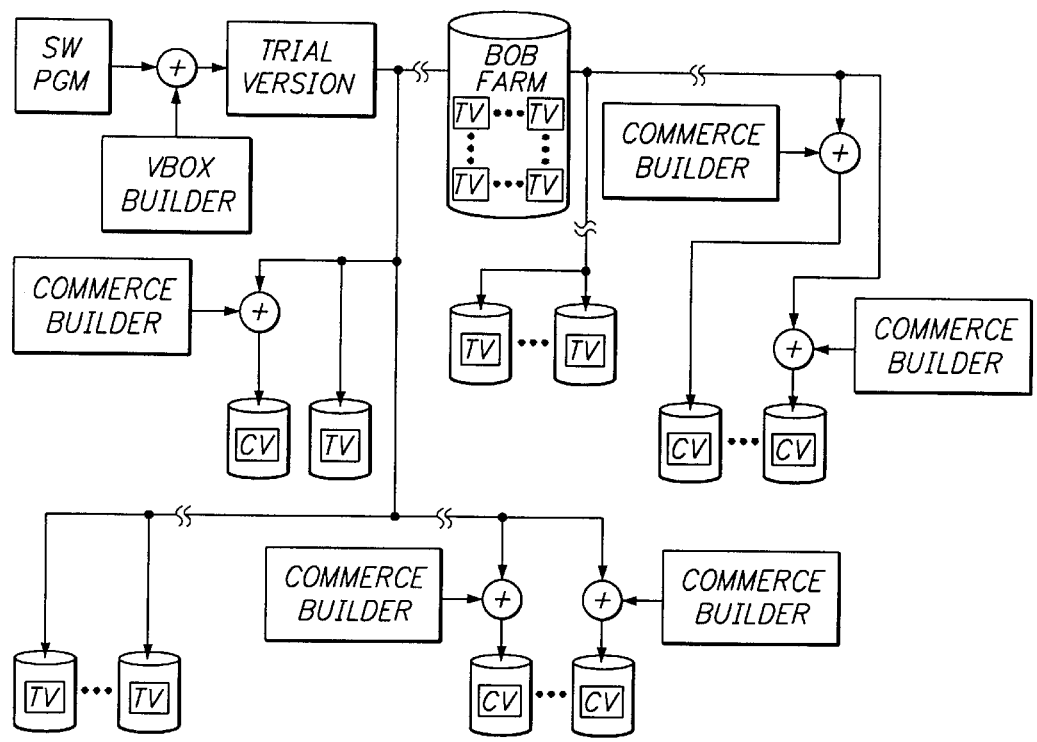
FIG. 3 is a block diagram of a software distribution system.

Referring to FIG. 3, the manner in which the software program may be distributed will be described. Beginning with the original software program, a technology provider tool is used to inject a trial module into the program. The tool used to perform injection is referred to herein as a Vbox™ builder tool, or virtual box builder tool. A virtual box is a smart software container of a type described herein. The Vbox builder produces a trial version of the program as described previously in relation to FIG. 2. The trial version may be distributed directly by the software publisher or may be distributed through various channels. The trial version may be "time-bombed" such that after a period of time the software publisher may be assured that no copies are functional. The trial version may also be hosted within a BOB farm and from the BOB farm be distributed through various channels.

A commerce builder tool may be used to turn the trial version into a Try/Buy version. Again, the conversion from trial-only to Try/Buy may be performed by the software publisher, and the trial version may be distributed directly by the software publisher. Alternatively, the conversion may be performed by various channel partners, and the resulting Try/Buy version may be distributed through various channels. The conversion may be performed by various channel partners using a trial version hosted within a BOB farm. The resulting Try/Buy versions are then distributed through various channels.

Note that each Try/Buy version may be different. In particular, the commerce methods of the various Try/Buy versions need not be the same. The commerce methods may include electronic purchase, telephone purchase, rental, pay-per-use, subscription, etc. In fact, as new commerce methods are developed, they may be implemented in the form of new commerce modules without altering the trial module, without requiring re-injection of the original executables, and without changes to the setup file set.

Figure 4:
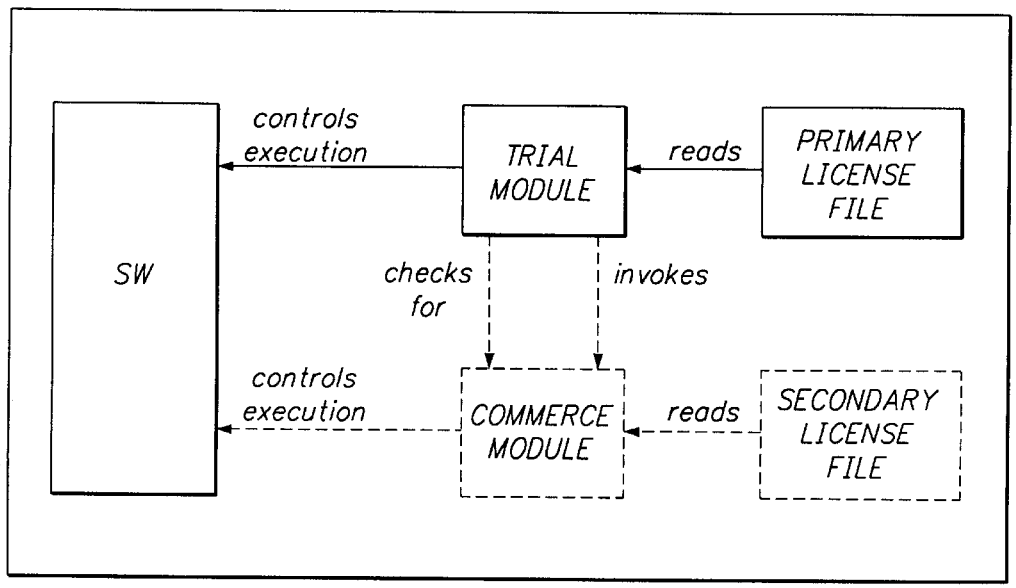
FIG. 4 is a block diagram of a Try/Buy application installed on an end user machine.

Referring now to FIG. 4, a block diagram is shown of a software version installed on an end user machine. The software version includes the original software, a trial DLL, and a primary license file, and may include an unlocking DLL and a secondary license file, indicated in dashed lines. The term "file" is used in a general sense to denote a container of digital information. The term "DLL" is used to describe any dynamic link library technology. During operation, the trial DLL checks for the presence of the unlocking DLL. In an exemplary embodiment, when an unlocking DLL is added using the commerce builder tool, the secondary license file is created, which may later be merged with the primary license file. The secondary license file may include server information and one or more keys to be used to unlock or purchase the software. For example, the secondary license file may contain keys required for secure Internet communication and/or a phone unlock key required for phone purchase.

In an exemplary embodiment, the secondary license file identifies the name and location of the unlocking DLL. If the trial DLL, in reading the secondary license file, determines that an unlocking DLL is available, then the trial DLL knows to load the unlocking DLL.

If no unlocking DLL is present, the trial DLL reads the primary license file and controls execution of the software accordingly. For example, the license file may specify a 30-day trial. The trial DLL stores encrypted trial parameters, such as number of days since installation, in persistent storage such as within the operating system registry. If the days installed trial parameter is 30 or less, then the trial DLL (in the case of a 30-day trial) will allow execution of the software. After the trial limit has been exceeded, then the trial DLL will not allow execution of the software.

If the unlocking DLL is present, then the trial DLL invokes the unlocking DLL. In an exemplary embodiment, the unlocking DLL is a superset of the trial DLL and includes both trial and commerce functionality. The primary license file is a subset of the secondary license file. The unlocking DLL runs, reads the primary license file and controls execution of the software accordingly.

Clearly, not all comers may be allowed to add unlocking capabilities to and to sell a trial software version indiscriminately. A mechanism must be established whereby the software publisher can exercise control over who is able to add unlocking capabilities to and to sell a software application. This control mechanism is established by including as part of the trial DLL and authorized unlocking DLLs a shared secret. When the trial DLL checks for an unlocking DLL, it also authenticates the unlocking DLL to ensure that the unlocking DLL is authorized to sell the software.

Figure 6:
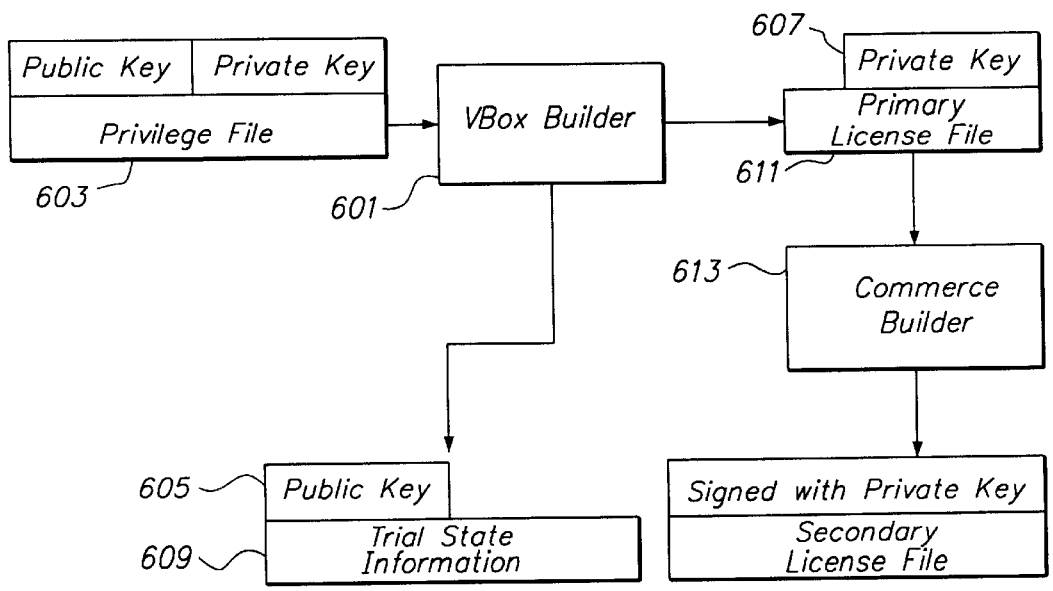
FIG. 6 is a block diagram illustrating authentication features of the license files read by the trial module and the unlocking module.

Referring more particularly to FIG. 6, during preparation of a trial version of a software program, the Vbox builder tool 601 uses a privilege file 603 that includes a public/private key pair. The public key 605 is stored with trial state information 607 that is guarded by the trial module (not shown). The private key 609 is encrypted and added to a license information file 611, external to a setup file set and therefore accessible without requiring penetration of the setup file set. During preparation of a commerce version of the software program, the commerce builder tool 613 obtains the encrypted private key 609 from the primary license file 611, decrypts it, and uses it to sign the secondary license file 615. During authentication, the trial module retrieves the public key 605 from the trial state information 607 and uses it to perform authentication of the secondary license file 615.

Figure 7:
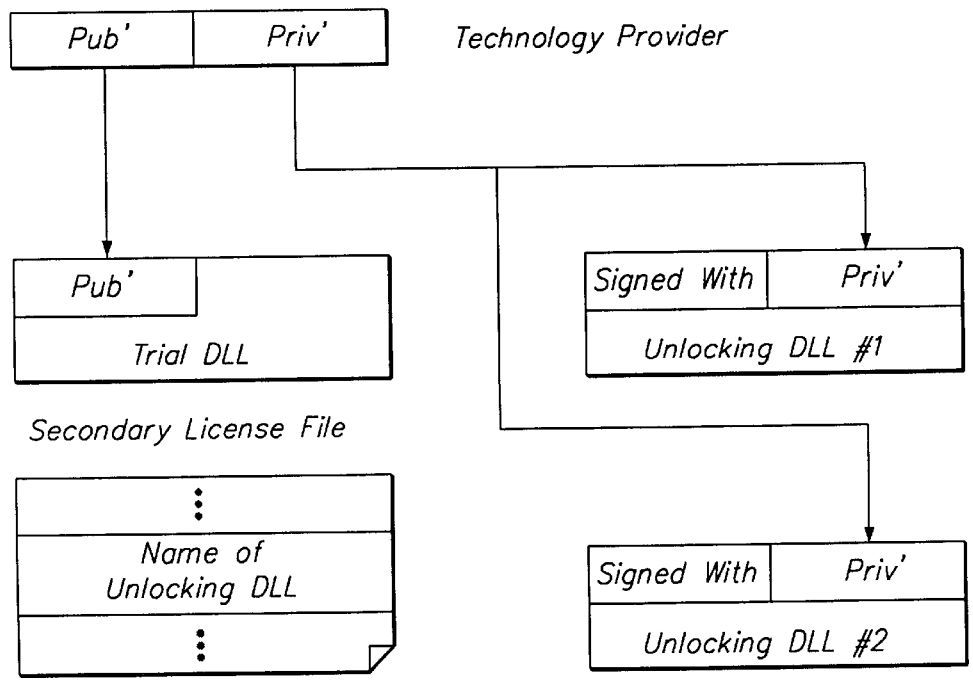
FIG. 7 is a diagram showing authentication of an unlocking module.

Referring to FIG. 7, an example is shown of one method the trial DLL may employ to authenticate the unlocking DLL. The technology provider creates a public/private key pair (Pub', Priv'). The private key is used to sign the unlocking DLLs provided by the technology provider. The matching public key is embedded in e trial DLL. The matching public key is embedded in the trial DLL. When the trial DLL starts, it authenticates the secondary license file, as previously described, reads the name of the unlocking DLL from the secondary license file, locates the unlocking DLL, and then verifies its signature, using the matching public key.

The trial DLL alone, or the trial DLL and the unlocking DLL together, may be referred to as a Vbox client. The client runs before the rest of the application, before any splash screens, login prompts, tips of the day, or other startup tasks.

Figure 5:
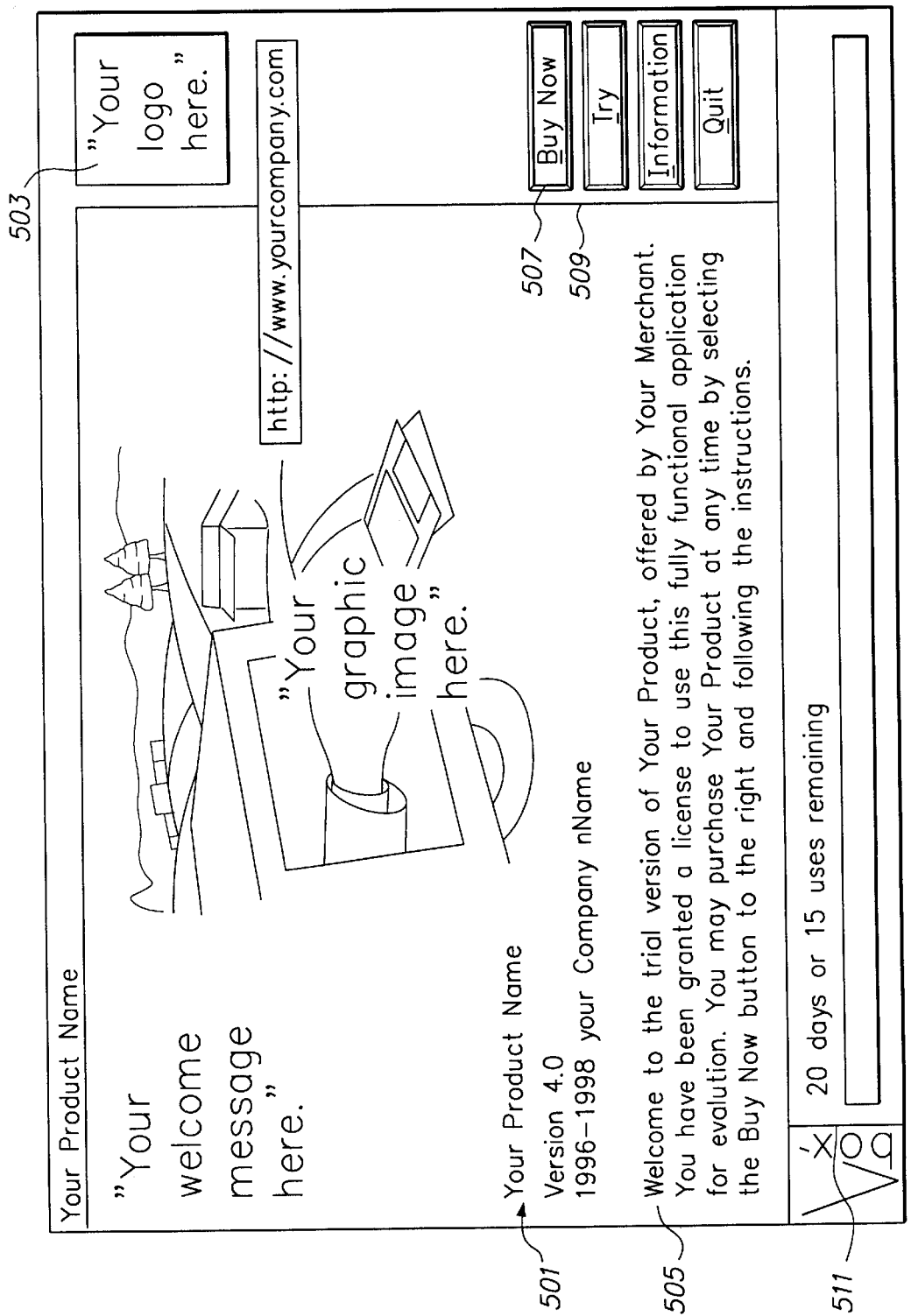
FIG. 5 is a screen display produced by a typical unlocking module client.

The client is the only part of the application that is visible at launch until the end user starts the trial or successfully purchase the application. A typical client window in shown in FIG. 5. Publisher and product information 501 and an icon 503 are all set by the merchant. The message 505, also set by the merchant, depends on the state of the client (e.g, first-time, in-trial, or expired). The end user clicks on a Buy Now button 507 to proceed with purchase. In the case of Try/Buy only, a Try First button 509 is visible during the trial period. A trial usage meter 511 show the end user how much of the trial is left. The software publisher can specify that the end user must register before using the application, in which case the end user must enter their basic name and email information into the application before the application will be allowed to run.

When unlocking is added by a merchant, the client interface is enhanced with the addition of the merchant's merchandising information. Most importantly, the "Buy Now" button is added, allowing the end user to directly purchase the application. Once the application has been purchased, the client window will not show up anymore, but part of the client will still run at every invocation of the application, protecting the application from illegal use.

The foregoing discussion has assumed that the BOB to which an unlocking module is to be added is a trial version of a software product. Alternatively, the BOB may be a Buy/Try enabled software product, i.e., commerce enabled but not trial enabled. It may be desirable to add a module that includes commerce capabilities or different commerce methods. What has heretofore been referred to as the trial module may therefore be more generally referred to as the default module, and the unlock module may be more generally referred to as the added module.

Furthermore, it may be desirable to upgrade from one added module to another while the software product is installed on an end user machine. Such an upgrade may be achieved where the end user machine has installed a software agent, or persistent client, of a type described in U.S. application Ser. No. 09/041,315, (Atty. Dkt. No. 031994-025) entitled INTERACTIVE CUSTOMER SUPPORT FOR COMPUTER PROGRAMS USING NETWORK CONNECTION OF USER MACHINE, filed Mar. 12, 1998, incorporated herein by reference. To allow for the possibility of upgrades, the default module is programmed to authenticate multiple added modules, if present, to query authenticated modules for version information, and to find and invoke the most recent version.

Also, the foregoing discussion has assumed that the added module, when called, functions in place of the default module. In other embodiments, the added module may in some or all instances return control to the default module. In this embodiment therefore, the default module calls the added module, which assists the default module in some way (e.g., by displaying a Buy control and supplying code that directs a purchase or payment transaction if the control is activated). The added module then returns control to the default module.

A further issue relates to the ability to wrap multiple executables in a coordinated manner. In an exemplary embodiment, the trial builder tool is designed to provide this capability. Using the Vbox builder tool, the software publisher specifies which executable(s) and/or code libraries need to be wrapped, and the Vbox builder tool then injects each of them in a secure, coordinated manner. When the end-user runs any of the wrapped executables (either directly, by double-clicking on them, or indirectly, by running an application which then calls on a wrapped executable or code library), the Vbox client will execute. If the end-user then runs a second wrapped application that is part of the same product, if a first related product is still running, the Vbox client will execute transparently, without showing the usual dialog. The perception by the user of a single product is therefore maintained. Furthermore, when the user purchases the application, all of its executables are unlocked together.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method of protecting a software program to be distributed electronically comprising the steps of:
   adding to the software program a protection module;
   installing the software program on an end-user machine;
   when startup of the software program is attempted, invoking the protection module;
   adding to the software program an unlocking module, the unlocking module being added separately from the protection module; and
   the protection module checking whether or not an unlocking module is present.

2. The method of claim 1, further comprising storing permission parameters on a persistent storage medium that is accessible by the protection module.

3. The method of claim 2, wherein if the unlocking module is not present, the protection module checks the permission parameters and allows or disallows use of the software program based on the permission parameters.

4. The method of claim 1, wherein the protection module is added using a first software tool and the unlocking module is added using a second separate software tool.

5. The method of claim 1, wherein if the unlocking module is present, the protection module authenticates and invokes the unlocking module.

6. The method of claim 5, wherein the unlocking module causes display of a user interface control for initiating a transaction for granting usage rights to the software program.

7. The method of claim 5, wherein the unlocking module locates and verifies an electronic license.

8. The method of claim 7, wherein the unlocking module communicates with a server that stores electronic licenses and dispenses authorization to execute software programs.

9. A flexible method of altering the behavior of a software program, comprising the steps of:
   adding a default module to the software program without altering source code of the software program;
   adding an added module to the software program without altering source code of the software program; and
   providing within the default module a mechanism whereby the default module check for and calls, the added module, a combined effect of the default module and the added module being to alter the behavior of the software program.

10. The method of claim 9, wherein the default module controls execution of the software program.

11. The method of claim 9, wherein the added module controls execution of the software program.

12. The method of claim 9, wherein the added module assists the default module in controlling execution of the software program.

13. The method of claim 9, wherein the added module is added to a self-installing setup file set.

14. The method of claim 9, wherein the added module is added to an application binary that is not self-installing but that relies on a separate installer.

15. The method of claim 10, wherein the default module is a protection module.

16. The method of claim 15, wherein the added module includes electronic commerce capabilities.

17. The method of claim 15, wherein the added module includes license management capabilities.

18. The method of claim 16, wherein the added module also includes trial monitoring capabilities.

19. The method of claim 9, wherein the default module is a Buy/Try module.

20. The method of claim 19, wherein the added module includes trial monitoring capabilities.

21. The method of claim 20, further comprising adding a further added module to the software program, wherein the default module compares version information of multiple added modules to determine an added module to be called.

22. A computer-readable medium comprising program instructions including:
 a software program and a code module foreign to but attached to the software program, the code module including program instructions that check for and, if present, call an added module distributed together with the foreign module;
 wherein the combined effect of the code module and the added module, if present, is to alter the behavior of the software program.

* * * * *